US012407710B2

(12) United States Patent
Lincoln et al.

(10) Patent No.: US 12,407,710 B2
(45) Date of Patent: Sep. 2, 2025

(54) METHOD FOR GENERATING ATTACK GRAPHS BASED ON MARKOV CHAINS

(71) Applicant: AttackIQ, Inc., San Diego, CA (US)

(72) Inventors: Stephen Lincoln, San Diego, CA (US); Rajesh Sharma, San Diego, CA (US); Jeremy Miller, San Diego, CA (US); Stephan Chenette, San Diego, CA (US); Albert Lopez, San Diego, CA (US)

(73) Assignee: AttackIQ, Inc., San Diego, CA (US)

( * ) Notice: Subject to any disclaimer, the term of this patent is extended or adjusted under 35 U.S.C. 154(b) by 204 days.

(21) Appl. No.: 18/232,700

(22) Filed: Aug. 10, 2023

(65) Prior Publication Data

US 2024/0056470 A1 Feb. 15, 2024

Related U.S. Application Data

(60) Provisional application No. 63/396,867, filed on Aug. 10, 2022.

(51) Int. Cl.
*H04L 9/40* (2022.01)
*G06N 7/01* (2023.01)

(52) U.S. Cl.
CPC .......... *H04L 63/1433* (2013.01); *G06N 7/01* (2023.01)

(58) Field of Classification Search
CPC .............................. H04L 63/1433; G06N 7/01
See application file for complete search history.

(56) References Cited

U.S. PATENT DOCUMENTS

| 6,907,396 | B1 | 6/2005 | Muttik et al. |
| 9,892,260 | B2 | 2/2018 | Kotler et al. |
| 10,200,259 | B1 | 2/2019 | Pukish et al. |
| 10,868,825 | B1 | 12/2020 | Dominessy et al. |

(Continued)

OTHER PUBLICATIONS

Choi et al, "Probabilistic Attack Sequence Generation and Execution Based on MITRE ATT&CK for ICS Datasets", CSET '21, Aug. 9, 2021, Virtual, CA, USA.

(Continued)

*Primary Examiner* — Anh Nguyen
(74) *Attorney, Agent, or Firm* — Run8 Patent Group, LLC; Peter Miller; Brian T. Chew

(57) ABSTRACT

A method includes: generating a transition probability matrix defining a set of transition probabilities for a set of techniques, each transition probability representing a probability of transitioning from a technique i to a technique j; defining a set of emission probability vectors corresponding to the set of techniques, each emission probability vector representing a probability of detecting a technique i and a probability of preventing a technique i; defining an initial technique vector representing an initial probability distribution of techniques; generating a hidden Markov model correlating a target sequence of observations with a hidden state sequence of techniques based on the transition probability matrix, the set of emission probability vectors, and the initial technique vector; and calculating a sequence of techniques, based on the hidden Markov model, exhibiting greatest probability to yield, for each technique in the sequence of techniques, absence of detection or prevention of the technique.

20 Claims, 4 Drawing Sheets

(56) References Cited

U.S. PATENT DOCUMENTS

| | | | |
|---|---|---|---|
| 11,336,669 | B2 | 5/2022 | Bazalgette et al. |
| 11,483,335 | B1* | 10/2022 | Tsokos .................... G06N 7/01 |
| 2007/0011319 | A1 | 1/2007 | McClure et al. |
| 2008/0271146 | A1 | 10/2008 | Rooney et al. |
| 2009/0320137 | A1 | 12/2009 | White et al. |
| 2010/0138925 | A1 | 6/2010 | Barai et al. |
| 2012/0151596 | A1 | 6/2012 | McClure et al. |
| 2014/0325634 | A1 | 10/2014 | Iekel-Johnson et al. |
| 2015/0020199 | A1 | 1/2015 | Neil et al. |
| 2015/0128246 | A1 | 5/2015 | Feghali et al. |
| 2015/0295948 | A1 | 10/2015 | Hassell et al. |
| 2016/0205122 | A1 | 7/2016 | Bassett |
| 2016/0261631 | A1 | 9/2016 | Vissamsetty et al. |
| 2016/0308895 | A1 | 10/2016 | Kotler et al. |
| 2017/0126712 | A1 | 5/2017 | Crabtree et al. |
| 2017/0220964 | A1 | 8/2017 | Ray |
| 2017/0279832 | A1 | 9/2017 | Pietro et al. |
| 2017/0289187 | A1 | 10/2017 | Noel et al. |
| 2018/0004942 | A1 | 1/2018 | Martin et al. |
| 2018/0103052 | A1 | 4/2018 | Choudhury et al. |
| 2018/0152468 | A1 | 5/2018 | Nor et al. |
| 2019/0245883 | A1 | 8/2019 | Gorodissky et al. |
| 2020/0067969 | A1 | 2/2020 | Abbaszadeh et al. |
| 2020/0128047 | A1 | 4/2020 | Biswas et al. |
| 2020/0244673 | A1 | 7/2020 | Stockdale et al. |
| 2021/0089647 | A1 | 3/2021 | Suwad et al. |
| 2021/0144159 | A1 | 5/2021 | Sanghvi et al. |
| 2021/0194924 | A1 | 6/2021 | Heinemeyer et al. |
| 2021/0314341 | A1 | 10/2021 | Moskovich et al. |
| 2022/0078210 | A1 | 3/2022 | Crabtree et al. |
| 2023/0018096 | A1* | 1/2023 | Ueda .................... H04L 63/145 |
| 2023/0396641 | A1* | 12/2023 | Hebbagodi ......... H04L 63/1408 |

OTHER PUBLICATIONS

Non-Final Office Action for U.S. Appl. No. 17/832,106 dated Oct. 6, 2022.

Notice of Allowance and Fees Due for U.S. Appl. No. 17/832,106 dated Jan. 31, 2023.

Takahashi et al., "APTGen: An Approach towards Generating Practical Dataset Labelled with Targeted Attack Sequences", USENIX CSET '20 Workshop Conference Paper.

\* cited by examiner

METHOD FOR GENERATING ATTACK GRAPHS BASED ON MARKOV CHAINS

CROSS-REFERENCE TO RELATED APPLICATIONS

This application claims the benefit of U.S. Provisional Application No. 63/396,867, filed on Aug. 10, 2022, which is incorporated in its entirety by this reference.

This application is related to U.S. patent application Ser. No. 17/832,106, filed on 3 Jun. 2022, which is incorporated in its entirety by this reference.

TECHNICAL FIELD

This invention relates generally to the field of information security and more specifically to a new and useful method for generating attack graphs based on Markov chains within the field of information security.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1:
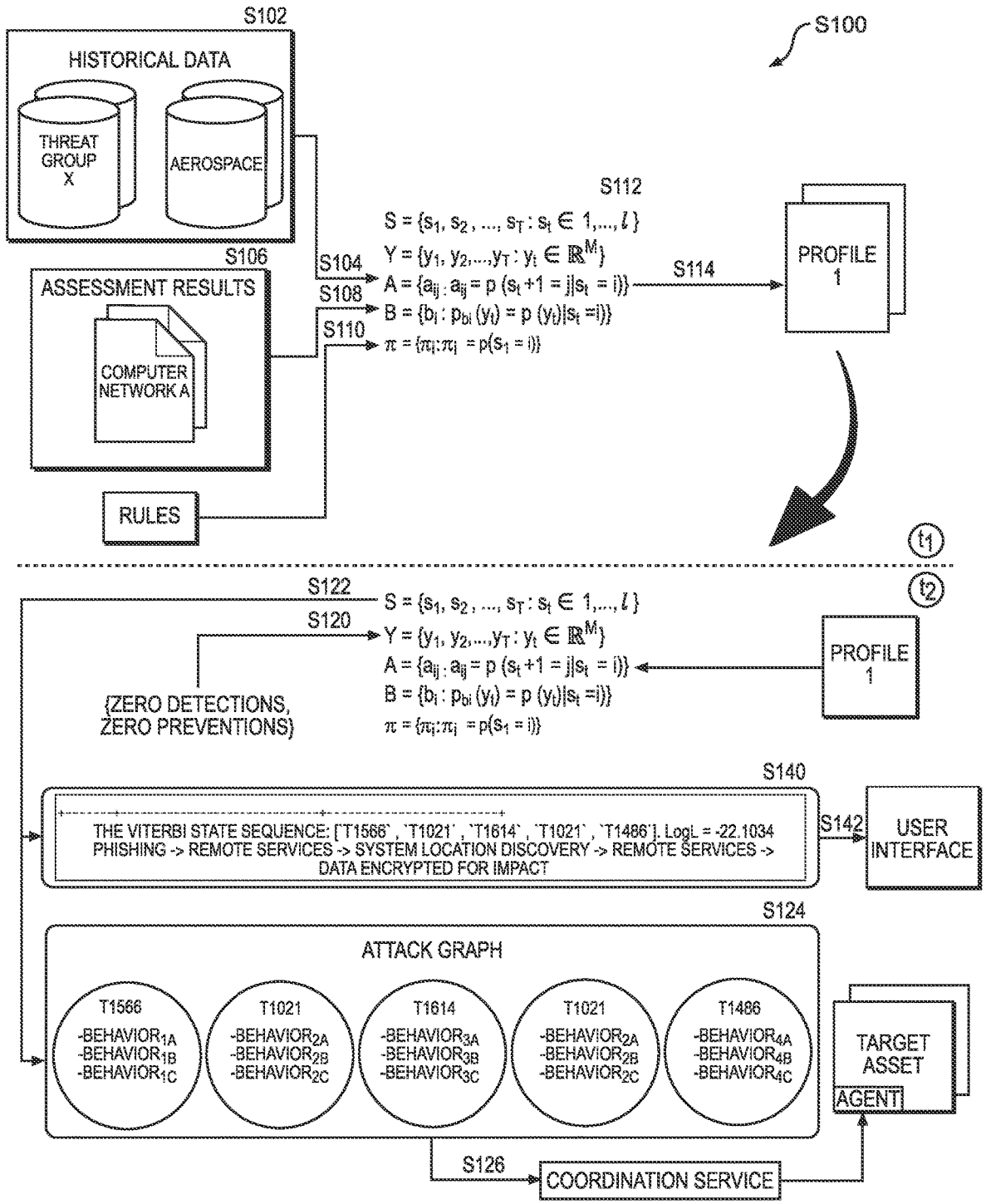
FIG. 1 is a flowchart representation of a method.
Figure 2A:
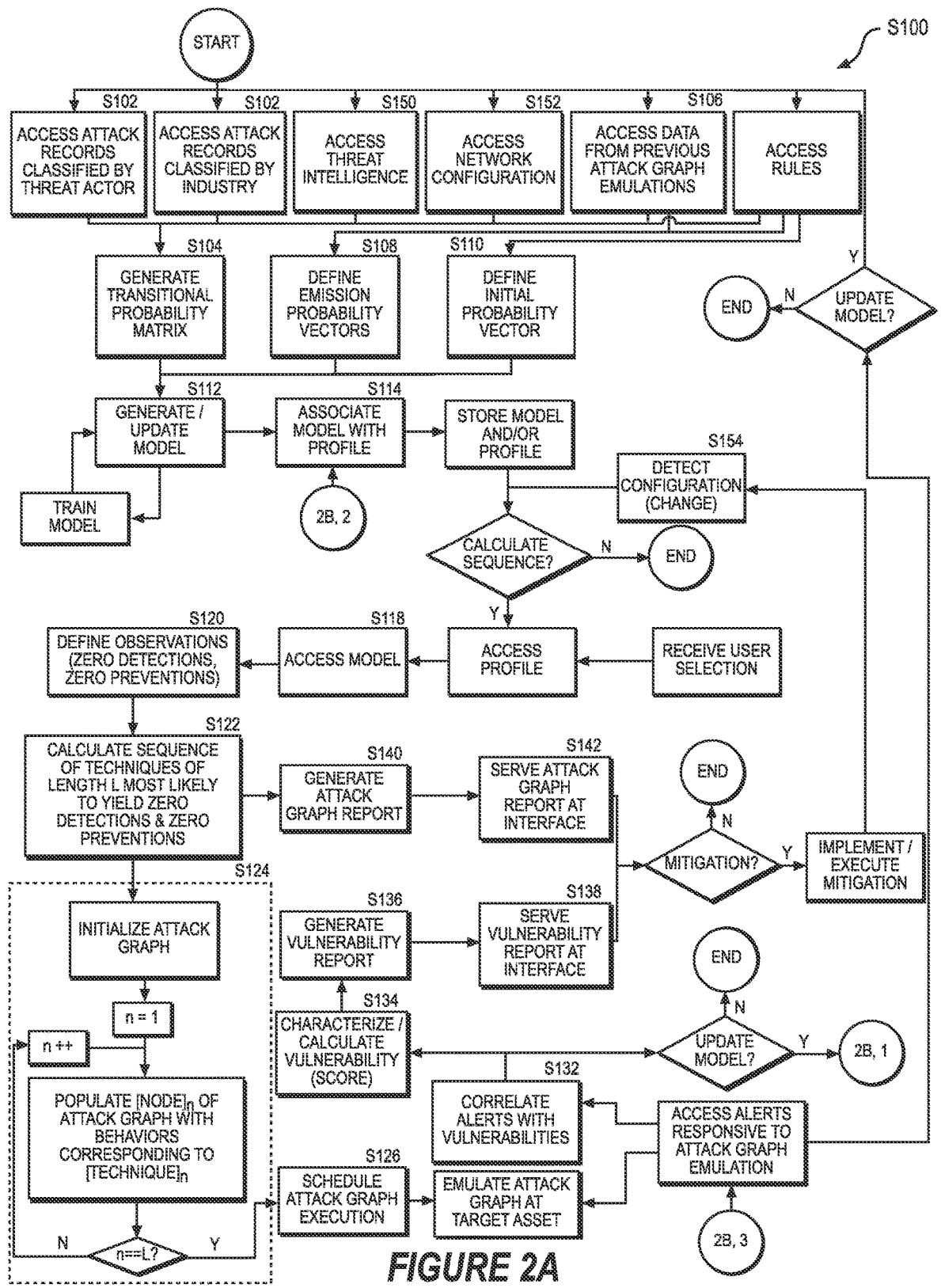
FIGS. 2A and 2B is a flowchart representation of one variation of the method.
Figure 2B:
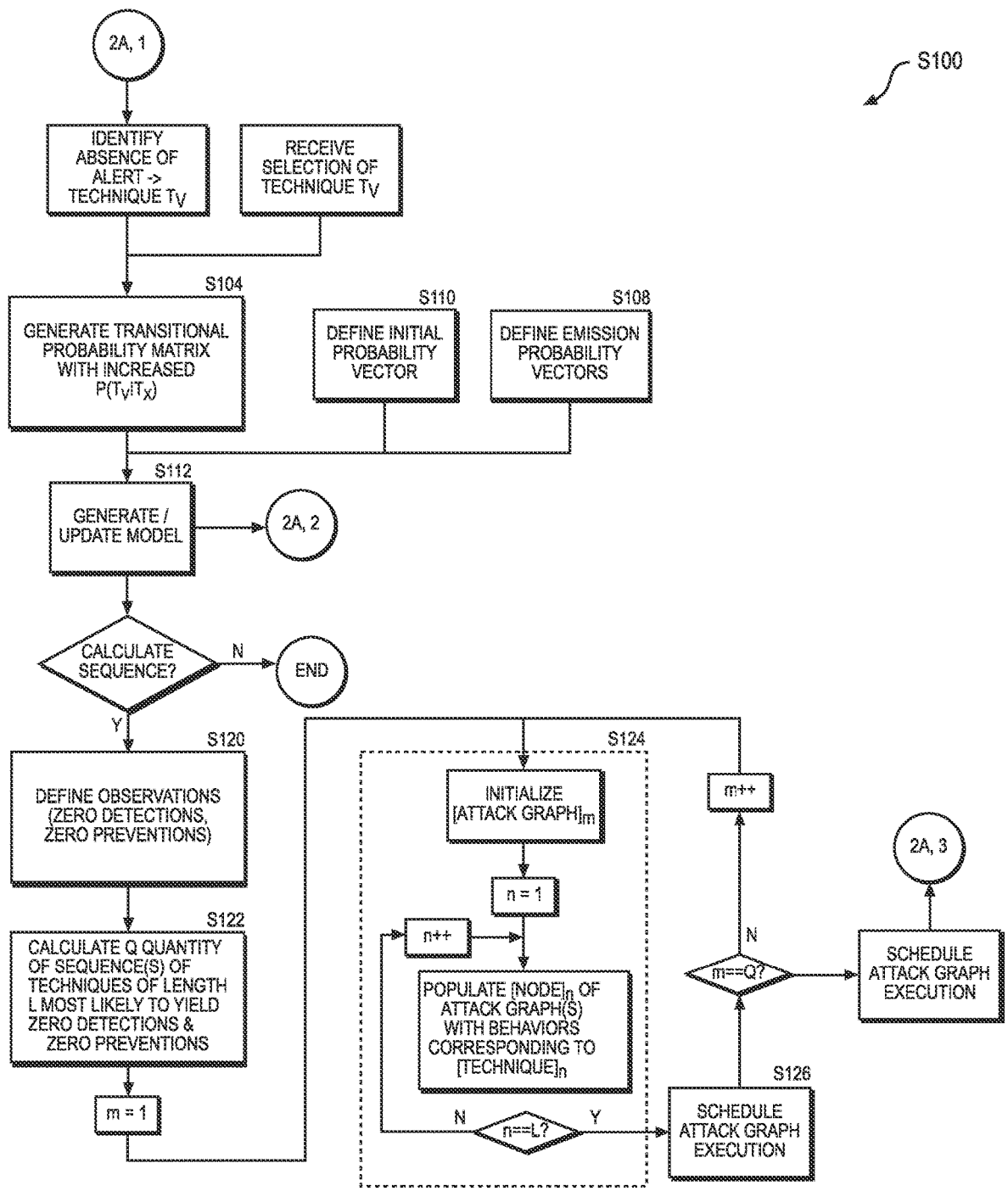

As shown in FIGS. 1, 2A, and 2B, a method S100 includes, during a first time period: accessing a set of historical data representing permutations of techniques, in a set of techniques, implemented in attacks on a second computer network occurring prior to the first time period in Block S102; generating a transition probability container defining a set of transition probabilities based on the set of historical data, the set of transition probabilities including a first transition probability representing a first probability of transitioning from a first technique, in the set of techniques, to a second technique in the set of techniques in Block S104; defining a set of emission probability containers corresponding to the set of techniques in Block S108, the set of emission probability containers including a first emission probability container representing a second probability of detecting the second technique and a third probability of preventing the second technique; defining an initial technique container representing an initial probability distribution of techniques in the set of techniques in Block Silo; and generating a model correlating a target sequence of observations with a hidden state sequence of techniques based on the transition probability container, the set of emission probability containers, and the initial technique container in Block S112.

The method S100 can also include, during a second time period succeeding the first time period: calculating a sequence of techniques in the set of techniques based on the model in Block S122, the sequence of techniques exhibiting greatest probability to yield, for each technique in the sequence of techniques, absence of detection of the technique and absence of prevention of the technique; generating an attack graph including a set of nodes linked according to the sequence of techniques in Block S124, each node in the set of nodes corresponding to a technique in the sequence of techniques and storing a behavior executable by a target asset on a target network to emulate the technique; and scheduling the target asset on the target network to selectively execute behaviors stored in the set of nodes in the attack graph during a third time period succeeding the second time period in Block S126.

1.1 Variation: Probabilistic Technique Exploration

As shown in FIGS. 1, 2A, 2B, and 3, one variation of the method S100 includes, during a first time period: accessing a set of historical data representing permutations of techniques, in a set of techniques, implemented in attacks on a second computer network by a first threat actor in a set of threat actors in Block S102; generating a transition probability container defining a set of transition probabilities based on the set of historical data in Block S104, the set of transition probabilities including a first transition probability representing a first probability of transitioning from a first technique, in the set of techniques, to a second technique in the set of techniques; defining a set of emission probability containers corresponding to the set of techniques in Block S108, the set of emission probability containers including a first emission probability container representing a second probability of detecting the second technique and a third probability of preventing the second technique; defining an initial technique container representing an initial probability distribution of techniques in the set of techniques in Block Silo; generating a first model correlating a target sequence of observations with a hidden state sequence of techniques based on the transition probability container, the set of emission probability containers, and the initial technique container in Block S112; and associating the first model with a first profile corresponding to the first threat actor in Block S114.

This variation of the method S100 also includes, during a second time period succeeding the first time period: accessing the first model in response to receiving selection of the first profile in Block S118; calculating a first sequence of techniques in the set of techniques based on the model in Block S122; and rendering an interface specifying the first sequence of techniques in Blocks S140, S142, and S160.

This variation of the method S100 further includes, in response to receiving selection of a third technique in the sequence of techniques, updating the interface based on the first model in Block S162, the interface specifying: a fourth probability of transitioning from the third technique to a fourth technique in the set of techniques; a fifth probability of detecting the fourth technique; and a sixth probability of preventing the fourth technique.

1.2 Variation: Attack Graph Report

As shown in FIGS. 1, 2A, 2B, and 3, one variation of the method S100 includes: accessing a set of historical data representing permutations of techniques, in a set of techniques, implemented in attacks on a second computer network in Block S102; generating a transition probability matrix defining a set of transition probabilities based on the set of historical data in Block S104, each transition probability in the set of transition probabilities representing a probability of transitioning from a technique i, in the set of techniques, to a technique j in the set of techniques; defining a set of emission probability vectors corresponding to the set of techniques in Block S108, each emission probability vector in the set of emission probability vectors representing a probability of detecting a technique i in the set of techniques and a probability of preventing a technique i in the set of techniques; defining an initial technique vector representing an initial probability distribution of techniques in the set of techniques in Block Silo; and generating a hidden Markov model correlating a target sequence of observations with a hidden state sequence of techniques based on the transition probability matrix, the set of emission probability vectors, and the initial technique vector in Block S112.

This variation of the method S100 also includes calculating a sequence of techniques in the set of techniques based on the hidden Markov model in Block S122, the sequence of techniques exhibiting greatest probability to yield, for each technique in the sequence of techniques: absence of detection of the technique; and absence of prevention of the technique.

This variation of the method S100 further includes: generating an attack graph report specifying the sequence of techniques in Block S140; and serving the attack graph report at a user interface in Block S142.

2. Applications

Generally, Blocks of the method S100 can be executed by a computer system (e.g., computing device) to configure a model (e.g., hidden Markov model) to probabilistically calculate an attack sequence most likely to result in absence of detections and preventions of techniques within the attack sequence. More specifically, Blocks of the method S100 can be executed by the computer system to configure the model based on: a transition probability container (e.g., matrix) defining transition probabilities between techniques based on historical data of real attacks on computer networks and/or custom rules; a set of emission probability containers (e.g., vectors) defining probabilities of detection or prevention of techniques on these (or similar) networks based on historical assessment results; and an initial technique container (e.g., vector) defining the initial probability distribution over the set of techniques as an initial technique in the sequence of techniques.

Additionally, Blocks of the method S100 can be executed by the computer system: to calculate a sequence of techniques—based on the model—most likely to result in absence of detections and preventions of techniques in the sequence of techniques; to generate an attack graph executable by a target device on a target network to emulate behaviors corresponding to techniques in the sequence of techniques; to schedule execution (or emulation) of the attack graph on the target device; and to display a report characterizing vulnerability of the target network responsive to execution of the attack graph on the target device. The computer system can also execute Blocks of the method S100: to identify a subset of techniques to which the target network is vulnerable based on absence of alerts—indicating detections or preventions of behaviors corresponding to the subset of techniques—responsive to execution of the attack graph on the target device; to generate additional attack graphs implementing the subset of techniques; and to schedule these additional attack graphs for execution on the target device (or another target device on the target network).

Accordingly, Blocks of the method S100 can be executed by the computer system: to generate a model that accurately identifies (or predicts) sequences of techniques most likely to be implemented in future attacks on the target network and/or most likely to test security gaps of the target network; and to rapidly generate and deploy attack graphs—based on these sequences of techniques—for execution on target assets on the target network. Therefore, Blocks of the method S100 can be executed by the computer system to aid security personnel to close security gaps and test limits of security controls in the target network.

2.1 Domain-Specific Model

Furthermore, Blocks of the method S100 can also be executed by the computer system to: configure the model specific to a selected industry, threat actor, and/or technique; and generate an attack graph including a sequence of techniques according to the selected profile and that is least likely to be detected, alerted, or prevented by security tools deployed on the computer network and configured on individual assets connected to the computer network.

Therefore, the computer system can execute Blocks of the method S100 to: analyze information on how assets and/or computer networks in specific technology sectors have historically been compromised in past attacks; and predict future exploitation methods based on past exploitation in the same—and possibly different —spaces. The computer system can thus execute Blocks of the method S100 to automatically generate complete attack graphs representative of how an attacker would attack the assets or the computer network according to a user-specified context, such as an attack graph specific to: an industry in which the user aligns; a threat group against which the user is defending; and/or a technique in which the user is interested.

2.2 Example

In one example application, the computer system can execute Blocks of the method S100 to configure the model specific to an aerospace industry profile by generating a transition probability matrix based on real world historical data of attacks on the aerospace industry and/or historical data of real threat groups targeting the aerospace industry. The computer system can further configure the model based on a set of emissions probability vectors specific to a target network or organization.

Therefore, the computer system can execute the method S100 to generate an attack graph that is specific to the aerospace industry and that includes techniques least likely to be detected or prevented by a target network affiliated with the aerospace industry. The computer system can thus execute Blocks of the method S100 to generate an attack graph to which the target network is most vulnerable.

2.2 Variations

The method S100 is described herein as executed by the computer system to calculate a sequence of techniques exhibiting greatest probability to yield absence of detections and preventions of techniques in the sequence. However, the computer system can similarly execute Blocks of the method S100 to: generate a model correlating a target sequence of observations with a hidden state sequence of tactics, techniques, and/or sub-techniques based on a transition probability matrix, a set of emission probability vectors, and an initial technique vector; and to calculate a sequence of tactics, techniques, and/or sub-techniques exhibiting greatest probability to yield absence of detections and preventions accordingly.

Additionally, the method S100 as described herein is executed by the computer system: to generate an attack graph storing behaviors executable by a target asset on a target network to emulate techniques; and to schedule execution (or emulation) of the attack graph on a target asset on a target network. However, the computer system can similarly execute Blocks of the method S100: to characterize the target asset and the target network as a virtual asset on a virtual network; to characterize security tools on the target network as virtual security tools on the virtual network; to generate the attack graph storing behaviors executable by the virtual asset on the virtual network to simulate techniques; to schedule execution (or simulation) of the attack graph on the virtual asset on the virtual network; and to aggregate alerts generated by the virtual security tools deployed on the virtual network while the virtual asset executed the attack graph.

3. Terminology

A "second network" is referred to herein as a computer network that was previously subject to a previous attack, such as a command-and-control or data-leak attack.

A "machine" is referred to herein as a computing device—such as a server, a router, a printer, a desktop computer, or a smartphone—within or connected to the second network and that was involved in the previous attack.

An "attack record" is referred to herein as a data file, investigation report, or other description of techniques, procedures, and artifacts of actions performed at a machine during the previous attack. For example, an application programming interface installed on or interfacing with the second network can capture packet fragments transmitted between machines internal and external to the second network and related metadata during the previous attack. The application programming interface can also capture metadata representative of these packet fragments, such as including: transmit times (or "timestamps"); source machine identifiers (e.g., IP or MAC addresses); destination machine identifiers; protocols (e.g., TCP, HTTP); packet payloads (or "lengths"); source and destination ports; request types (e.g., file requests, connection initiation and termination requests); and/or request response types (e.g., requests confirmed, requests denied, files sent). A security analyst or computer system can then: filter these packet fragments to remove packet fragments not related (or unlikely to be related) to the previous attack; interpret a sequence of actions executed by a machine during the previous attack based on the remaining packet fragments and metadata; and derive techniques, procedures, and artifacts of these actions from these packet fragments and metadata.

A "target network" is referred to herein as a computer network on which an attack is emulated by a target asset attempting behaviors prescribed in nodes of an attack graph—according to Blocks of the method S100—in order to detect vulnerabilities in the attack on the target network and thus verify that security technologies deployed on the target network are configured to respond to (e.g., detect, prevent, or alert on) analogous attacks.

An "asset" is referred to herein as a computing device—such as a server, a router, a printer, a desktop computer, a smartphone, or other endpoint device—within or connected to the target network.

An "internal agent" is referred to herein as an asset—within the target network—loaded with attack emulation software and thus configured to execute steps of attack emulations on the target network.

An "attack emulation" is described herein as attempted execution of an attack graph by an internal agent executing on a target asset on the target network.

4. System

As shown in FIG. 1, a computer system can interface with (or include): a coordination service; and a set of internal agents installed on assets (e.g., computing devices) within a target network.

In one implementation, when the method S100 is enabled on the target network, an administrator or other affiliate of the target network: installs an instance of a coordination service on a machine within the target network; and supplies login information or other credentials for security controls (e.g., direct and aggregate network threat management systems) installed or enabled across the target network or at particular assets within the target network. The coordination service can then: load plugins for these security controls; automatically enter login information or other credentials supplied by the administrator in order to gain access to event logs generated by these security controls responsive to activity detected on the target network; and retrieve current settings and configurations of these security controls within the target network, such as whether these security controls are active and whether active security controls are configured to detect, prevent, or alert on certain network activities or attacks on nodes or the network more generally.

In another implementation, an internal agent is: installed on an asset (e.g., an internal server, a printer, a desktop computer, a smartphone, a router, a network switch) within the target network; and loaded with an attack emulation software configured to send and receive data packets according to emulation actions within an attack emulation generated by the computer system.

The computer system can implement similar methods and techniques described in U.S. patent application Ser. No. 17/832,106: to initialize an attack graph including a set of nodes; to populate each node in the attack graph with a set of behaviors—corresponding to techniques, sub-techniques, and/or procedures—that replicate and/or are analogous (e.g., in result) to actions executed on a machine in a second network during a previous known attack; to link the set of nodes in the attack graph according to a sequence of actions (e.g., representing the previous known attack) executable by a target asset on a target network to emulate the set of behaviors that occurred previously on the machine in the second network; and to schedule execution of the attack graph by an internal agent deployed on the target asset in the target network.

In particular, an internal agent can: load an attack graph; select a first node in the attack graph; select a first (e.g., highest-ranking) behavior in the first node; attempt completion of the first behavior; and transition to a second node in the attack graph responsive to successful completion of the first behavior or select and repeat this process for a second behavior in the attack graph. The internal agent can then repeat this process for subsequent nodes of the attack graph until: the internal agent fails to complete all behaviors within one node; or completes a behavior in the last node in the attack graph to complete the attack graph.

The computer system can: aggregate alerts generated by security tools deployed on the target network while the target asset executed the attack graph; identify a subset of alerts corresponding to behaviors in the attack graph executed by the target asset; calculate vulnerability of the target network to behaviors within the attack graph and similar variants based on types and presence of detection and prevention alerts in this subset of alerts; and/or calculate vulnerability of the target network to these behaviors and similar variants based on whether the target asset completed at least one behavior in each node in the attack graph.

Accordingly, the computer system can configure each internal agent to emulate a customized set of behaviors, generally based upon real-world attack profiles. Therefore, the computer system can test and validate the security controls of the target network and the target asset.

5. Attack Sequence Model

Generally, as shown in FIGS. 1, 2A, and 2B, the computer system can generate a model configured to probabilistically calculate a sequence of techniques. For example, the computer system can generate the model configured to calculate the sequence of techniques in a set of techniques including: techniques for initial access; techniques to establish a persistent presence on a target network at a single node by hiding, obfuscating, or covering artifacts of its presence; techniques for privilege escalation; techniques for security controls evasion; techniques for credential access; techniques to discover accounts and accesses on the target network; techniques to make preparations to move laterally within the target network; techniques for collecting data at the single node; techniques for asserting command and control over the single node; techniques for preparing to exfiltrate data from the single node; and techniques for impacting or disrupting the single node (e.g., data encryption or resource hijacking).

In one implementation, in Block S112, the computer system can generate a model (e.g., hidden Markov model) correlating a target sequence of observations with a hidden state sequence of techniques based on a transition probability container (hereinafter "transition probability matrix"), a set of emission probability containers (hereinafter "emission probability vectors"), and an initial technique container (hereinafter initial technique vector").

More specifically, the computer system defines a hidden Markov model characterized by:

$S=\{s_1,s_2,\ldots,s_T:s_t\in1,\ldots,l\}$ $Y=\{y_1,y_2,\ldots,y_T:y_t\in\mathbb{R}^M\}$ $A=\{a_{ij}:a_{ij}=p(s_{t+1}=j|s_t=i)\}$ $B=\{b_i:p_{bi}(y_t)=p(y_t|s_t=i)\}$ $\pi=\{\pi_i:\pi_i=p(s_1=i)\}$.

In this model: S is a hidden sequence of techniques, T is a number of techniques in the sequence, and l is a number of techniques in the model; Y is an observed sequence of vectors, each vector including a first element representing if a technique is detected and a second element representing if a technique is prevented, and each element in each vector is represented with a binomial distribution (e.g., detection of a technique, absence of detection of the technique; prevention of a technique, absence of prevention of the technique); A is a transition probability matrix defining a probability of transitioning from a technique i at a time t to a technique j at a time t+1, and t is an ordered step in the sequence; B is a set of emission probability vectors defining (i) a probability of detection of the technique i at the time t and (ii) a probability of prevention of the technique i at the time t; and π is an initial technique probability distribution. The computer system can represent each element in each vector in the sequence of vectors with a binomial distribution.

In another implementation, the computer system can generate the model configured to calculate a sequence of techniques exhibiting greatest probability to yield, for each technique in the sequence of techniques: absence of detection of the technique; and absence of prevention of the technique.

Accordingly, by calculating a sequence of techniques exhibiting greatest probability to yield absence of detections and preventions of techniques in the sequence, the computer system can thereby generate an attack graph—based on the sequence of techniques—that, when emulated by a target asset on a target network, is least likely to be detected, alerted, or prevented by security tools deployed on the target network and configured on individual assets connected to the target network. Therefore, the computer system can assist in closing security gaps and testing limits of security controls in a target network.

5.1 Transition Probability Matrix

Blocks of the method S100 recite: accessing a set of historical data representing permutations of techniques, in a set of techniques, implemented in attacks on a second computer network occurring prior to the first time period in Block S102; and generating a transition probability container defining a set of transition probabilities based on the set of historical data in Block S104, the set of transition probabilities including a first transition probability representing a first probability of transitioning from a first technique, in the set of techniques, to a second technique in the set of techniques.

Generally, in Block S104, the computer system can generate a transition probability matrix defining a set of transition probabilities for the set of techniques. More specifically, the computer system can generate the transition probability matrix defining a probability of transitioning from a technique i in the set of techniques at a time t to a technique j in the set of techniques at a time t+1.

In one implementation, the computer system can: access a set of historical data (e.g., threat reports, logs, attack records) representing sequences of techniques implemented in previous attacks in Block S102; and generate the transition probability matrix based on the historical data in Block S104.

More specifically, the computer system can access a corpus of attack records specifying tactics, techniques, and/or procedures performed at machines during previous attacks. Based on the corpus of attack records, the computer system can derive, for a first technique in the set of techniques: a probability of the first technique being implemented in an attack; probabilities of transitioning from other techniques—in the set of techniques—to the first technique; and probabilities of transitioning from the first technique to the other techniques. The computer system can: repeat this process for each technique in the set of techniques to define a set of transition probabilities; and generate the transition probability matrix defining the set of transition probabilities based on the corpus of attack records, each transition probability in the set of transition probabilities representing a probability of transitioning from a technique i, in the set of techniques, to a technique j in the set of techniques.

In one example, the computer system generates the transition probability matrix defining a first transition probability—to a first technique $T_1$ for credential dumping—corresponding to $P(T_1|T_X)=0.8$ based on the corpus of attack records representing a first utilization of the first technique $T_1$ exceeding an average range of utilizations of techniques during previous attacks.

In another example, the computer system generates the transition probability matrix defining a second transition probability—to a second technique $T_2$ for audio capture—corresponding to $P(T_2|T_X)=0.2$ based on the corpus of attack records representing a second utilization of the second technique $T_2$ falling below the average range of utilizations of techniques during previous attacks.

In another example, the computer system generates the transition probability matrix defining a third transition probability—to a third technique $T_3$ for modifying registry—corresponding to $P(T_3|T_X)=0.5$ based on the corpus of attack records representing a third utilization of the third technique $T_3$ falling within the average range of utilizations of techniques during previous attacks.

In another implementation, the computer system can: assign a weight to a subset of historical data; and generate the transition probability matrix based on the subset of historical data according to the weight.

For example, the computer system can assign a weight to historical data based on recency of the historical data (e.g., more recent historical data is assigned an increased weight). In this example, the computer system can: access a first attack record representing a first attack during a first time period; access a second attack record representing a second attack during a second time period succeeding the first time period; assign a first weight to the first attack record; assign a second weight—exceeding the first weight—to the second attack record; and generate the transition probability matrix based on the first attack record according to the first weight and the second attack record according to the second weight.

5.1.1 Rules

Generally, the computer system can generate a transition probability matrix according to a set of rules.

In one implementation, the computer system can generate the transition probability matrix according to a rule defining a decreased probability (e.g., P=0) for improbable (or impossible) transitions.

In one example, the computer system generates the transition probability matrix defining a fourth transition probability of transitioning from a fourth technique for initial access $T_{1A}$ to a fifth technique for exfiltrating data $T_{exf}$ corresponding to $P(T_{exf}|T_{1A})=0$. Similarly, in this example, the computer system generates the transition probability matrix defining a fifth transition probability of transitioning from the fourth technique for initial access to a sixth technique for impacting the target network $T_{imp}$ as $P(T_{imp}|T_{1A})=0$. Additionally, the computer system generates the transition probability matrix defining a sixth transition probability of transitioning from a fifth technique for exfiltration or a sixth technique impact to a next technique as $P(T_X|T_{exf})=P(T_X|T_{imp})=0$.

In another example, the computer system generates the transition probability matrix defining a seventh transition probability—to a seventh technique $T_7$-corresponding to $P(T_7|T_X)=0$ in response to the seventh technique corresponding to a non-applicable technique in a target network (e.g., the target network implements a system architecture or operating system different from that which the seventh technique affects).

In another implementation, in Block S152, the computer system can access first configuration data representing a first configuration of the target network including a set of target assets, each target asset in the set of target assets including an operating system characterized by a first operating system type.

In this implementation, the computer system can generate the transition probability matrix defining the set of transition probabilities based on the first configuration data, the set of transition probabilities including a transition probability representing a probability of transitioning from an eighth technique to a ninth technique
associated with a second operating system type different from the first operating system
corresponding to zero (e.g., $P(T_9|T_8)=0$).

5.1.2 Domain-Specific Transition Probability Matrix

In one implementation, the computer system can: separate (or classify) the set of historical data into subsets of historical data, such as based on threat actor (e.g., threat group, country), target industry (e.g., aerospace, financial, government, manufacturing, military, utility), target country, etc.

In one example, the computer system classifies a first subset of historical data associated with attacks by a particular country. In another example, the computer system classifies a second subset of historical data associated with attacks on aerospace industry. In another example, the computer system classifies a third subset of historical data associated with attacks on financial industry in the United States by a first threat group.

In another implementation, the computer system can generate the transition probability matrix based on a subset of historical data classified according to threat actor, target industry, and/or target country, etc. In this implementation, the computer system can implement methods and techniques described above to: access the subset of historical data (e.g., associated with a particular threat actor, associated with a particular target country, associated with a particular target country); and generate the transition probability matrix based on the subset of historical data.

In one example, the computer system: accesses a first subset of historical data associated with attacks by a first threat group; and generates a first transition probability matrix defining a first transition probability—to a first technique $T_1$ for command and scripting interpreter—corresponding to $P(T_1|T_X)=0.85$ based on the first subset of historical data representing a first utilization of the first technique $T_1$ exceeding a first average range of utilizations of techniques during previous attacks by the first threat group.

In this example, the computer system generates the first transition probability matrix defining a second transition probability—to a second technique $T_2$ for data from removable media—corresponding to $P(T_2|T_X)=0.15$ based on the first subset of historical data representing a second utilization of the second technique $T_2$ falling below the first average range of utilizations of techniques during previous attacks by the first threat group.

In another example, the computer system: accesses a second subset of historical data associated with attacks by a second threat group; and generates a second transition probability matrix defining a third transition probability—to the first technique $T_1$ for command and scripting interpreter—corresponding to $P(T_1|T_X)=0.50$ based on the second subset of historical data representing a third utilization of the first technique $T_1$ falling within a second average range of utilizations of techniques during previous attacks by the second threat group.

In this example, the computer system generates the second transition probability matrix defining a fourth transition probability—to the second technique $T_2$ for data from removable media—corresponding to $P(T_2|T_X)=0.70$ based on the second subset of historical data representing a fourth utilization of the second technique $T_2$ exceeding the second average range of utilizations of techniques during previous attacks by the second threat group.

5.1.3 Technique-Specific Transition Probability Matrix

In one implementation, the computer system can: separate (or classify) the set of historical data into subsets of historical data based on a target technique in the set of techniques.

In one example, the computer system classifies a first subset of historical data associated with a first technique for credential dumping (e.g., a first subset of historical data representing attacks implementing the first technique for credential dumping).

In another example, the computer system classifies a second subset of historical data associated with a second technique for audio capture (e.g., a second subset of historical data representing attacks implementing the second technique for audio capture).

In another implementation, the computer system can generate the transition probability matrix based on a subset of historical data classified according to the target technique. In this implementation, the computer system can implement methods and techniques described above to: access the subset of historical data associated with the target technique; and generate the transition probability matrix based on the subset of historical data.

In one example, the computer system generates the transition probability matrix defining a first transition probability—to the first technique $T_1$ for credential dumping—corresponding to $P(T_1|T_X)=0.8$ based on the first subset of historical data associated with the first technique for credential dumping.

In another example, the computer system generates the transition probability matrix defining a second transition probability—to a second technique $T_2$ for audio capture—corresponding to $P(T_2|T_X)=0.76$ based on the second subset of historical data associated with the second technique for audio capture.

5.2 Emission Probability Vectors

Block S108 of the method S100 recites defining a set of emission probability containers corresponding to the set of techniques, the set of emission probability containers including a first emission probability container representing: a second probability of detecting the second technique; and a third probability of preventing the second technique.

Generally, in Block S108, the computer system can define a set of emission probability vectors for the set of techniques. More specifically, the computer system can define an emission probability vector representing: a probability of detection of a technique i at a time t; and a probability of prevention of the technique i at the time t. Additionally or alternatively, the computer system can define the emission probability vector representing: a probability of absence of detection of a technique i at a time t; and a probability of absence of prevention of the technique i at the time t.

In one implementation, in Block S106, the computer system can access historical assessment results indicating: detection or absence of detection of a technique; and prevention or absence of prevention of a technique. For example, the computer system can access historical assessment results of tested techniques (e.g., execution of attack graphs storing behaviors corresponding to the tested techniques) executed in an evaluation platform on a target network and/or across various target networks. The computer system can then define the set of emission probability vectors based on the historical assessment results in Block S108.

In another implementation, the computer system can: assign a weight to a subset of historical assessment results; and define the set of emission probability vectors based on the subset of historical assessment results according to the weight.

For example, the computer system can assign a weight to historical assessment results based on recency (e.g., more recent historical assessment results are assigned an increased weight). In this example, the computer system can: access a first subset of historical assessment results representing detections and preventions of techniques during a first time period; access a second subset of historical assessment results representing detections and preventions of techniques during a second time period succeeding the first time period; assign a first weight to the first subset of historical assessment results; assign a second weight—exceeding the first weight—to the second subset of historical assessment results; and define the set of emission probability vectors based on the first subset of historical assessment results according to the first weight and the second subset of historical assessment results according to the second weight.

Additionally or alternatively, the computer system can calculate a probability of detection of a non-tested technique and a probability of prevention of the non-tested technique based on shared data sources and/or mitigations mapped to tested techniques, and the computer system can then define the set of emission probability vectors accordingly.

In one variation, the computer system can generate the set of emission probability vectors based on a particular user or target network. In particular, the computer system can: access a subset of historical assessment results corresponding to the particular user or target network; and generate the set of emission probability vectors based on the subset of historical assessment results.

5.2.1 Network-Specific Emission Probability Vectors

In one implementation, the computer system can define the set of emission probability vectors based on a particular network (e.g., target network(s), network(s) affiliated with a particular industry, network(s) targeted by a particular threat actor).

In one example, the computer system: accesses a first subset of historical assessment results corresponding to a first subset of networks affiliated with a particular industry (e.g., aerospace industry, financial industry), the first subset of historical assessment results indicating detections (or absences of detection) of techniques and preventions (or absences of prevention) of techniques on the first subset of networks; and defines the set of emission probability vectors based on the first subset of historical assessment results.

In another example, the computer system: accesses a second subset of historical assessment results corresponding to a second subset of networks subjected to attacks by a particular threat actor, the second subset of historical assessment results indicating detections (or absences of detection) of techniques and preventions (or absences of prevention) of techniques on the second subset of networks; and defines the set of emission probability vectors based on the second subset of historical assessment results.

5.3 Initial Technique Vector

Block S110 of the method S100 recites defining an initial technique container representing an initial probability distribution of techniques in the set of techniques.

Generally, in Block S110, the computer system can define an initial probability distribution over the set of techniques. More specifically, the computer system can define the initial probability distribution over the set of techniques as an initial technique in a sequence of techniques.

In one implementation, in Block S110, the computer system can generate the initial technique vector based on a set of rules.

In one example, the computer system defines the initial technique vector according to a first rule requiring a technique for initial access as an initial technique in the sequence of techniques. In this example, the computer system defines the initial technique vector representing a probability of one for a technique for initial access as an initial technique in the sequence of techniques ($\phi_{IA}=1$).

In another example, the computer system defines the initial technique vector defining a probability of zero for any technique different from the technique for initial access as the initial technique ($\phi_X=0$). More specifically, the computer system defines the initial technique vector representing a probability of zero for a technique for exfiltration as the initial technique ($\phi_{exf}=0$).

5.4 Model Generation

Block S112 of the method S100 recites generating a model correlating a target sequence of observations with a hidden state sequence of techniques based on the transition probability container, the set of emission probability containers, and the initial technique container.

In one implementation, in Block S112, the computer system can generate a model (e.g., hidden Markov model) correlating a target sequence of observations with a hidden state sequence of techniques based on the transition probability matrix, the set of emission probability vectors, and the initial technique vector. The computer system can store the model in a data repository.

5.5 Profiles

Generally, the computer system can generate a model specific to: a threat actor in a set of threat actors; an industry in a set of industry; a technique in the set of techniques; and/or a target network(s); etc. The computer system can then associate the model with a profile corresponding to the threat actor, the industry, the technique, and/or the target network.

5.5.1 Threat Actor Profile

Block S114 of the method S100 recites associating the first model with a first profile corresponding to the first threat actor.

In one implementation, the computer system can: access a first subset of historical data representing permutations of techniques, in the set of techniques, implemented in attacks (e.g., previous attacks on a second computer network) by a first threat actor in a set of threat actors; and generate a first transition probability matrix based on the first subset of historical data. The computer system can generate a first model correlating the target sequence of observations with the hidden state sequence of techniques based on the first transition probability matrix, a set of emission probability vectors (e.g., a set of emission probability vectors defined based on network(s) targeted by the first threat actor), and an initial technique vector.

In another implementation, in Block S114, the computer system can associate the first model with a first profile corresponding to the first threat actor. The computer system can store the first model and/or the first profile in a data repository.

Accordingly, by generating the transition probability matrix based on the first subset of historical data representing real attacks by the first threat actor, the computer system can thereby configure the model to probabilistically calculate a sequence of techniques specific to the first threat actor, such as a particular sequence of techniques most likely to be implemented by the first threat actor and exhibiting greatest probability to yield, for each technique in the particular sequence of techniques: absence of detection of the technique on a target network; and absence of prevention of the technique on the target network. Therefore, the computer system can automatically generate custom attack graphs—based on the particular sequence of techniques—to expose vulnerabilities of the target network to the first threat actor.

5.5.2 Industry Profile

Block S114 of the method S100 recites associating the second model with a second profile corresponding to aerospace industry.

In one implementation, the computer system can: access a second subset of historical data representing permutations of techniques, in the set of techniques, implemented in attacks affiliated with a target industry (e.g., aerospace, financial, government, utility); and generate a second transition probability matrix based on the second subset of historical data.

The computer system can generate a second model correlating the target sequence of observations with the hidden state sequence of techniques based on the second transition probability matrix, a set of emission probability vectors (e.g., a set of emission probability vectors defined based on network(s) affiliated with the target industry), and an initial technique vector.

In another implementation, in Block S114, the computer system can associate the second model with a second profile corresponding to the target industry (e.g., aerospace industry). The computer system can store the second model and/or the second profile in a data repository.

Accordingly, by generating the transition probability matrix based on the second subset of historical data representing real attacks on networks affiliated with aerospace industry, the computer system can thereby configure the model to probabilistically calculate a sequence of techniques specific to aerospace industry, such as a particular sequence of techniques most likely to be implemented on a target network affiliated with aerospace industry and exhibiting greatest probability to yield, for each technique in the particular sequence of techniques: absence of detection of the technique on a target network; and absence of prevention of the technique on the target network. Therefore, the computer system can automatically generate custom attack graphs—based on the particular sequence of techniques—to expose vulnerabilities of the target network specific to aerospace industry.

5.5.3 Technique Profile

In another implementation, the computer system can: access a third subset of historical data associated with a target technique in the set of techniques (e.g., a third subset of historical data representing attacks implementing the first technique for credential dumping); and generate a third transition probability matrix based on the third subset of historical data. The computer system can generate a third model correlating the target sequence of observations with the hidden state sequence of techniques based on the third transition probability matrix, a set of emission probability vectors, and an initial technique vector.

In another implementation, in Block S114, the computer system can associate the third model with a third profile corresponding to the target technique (e.g., the technique for credential dumping). The computer system can store the third model and/or the third profile in a data repository.

Accordingly, by generating the transition probability matrix based on the third subset of historical data representing real attacks on networks implementing the third technique for credential dumping, the computer system can thereby configure the model to probabilistically calculate a sequence of techniques specific to a target technique (e.g., the third technique for credential dumping), such as a particular sequence of techniques most likely to implement the third technique for credential dumping and exhibiting greatest probability to yield, for each technique in the particular sequence of techniques: absence of detection of the technique on a target network; and absence of prevention of the technique on the target network. Therefore, the computer system can automatically generate custom attack graphs—based on the particular sequence of techniques—to expose vulnerabilities of the target network specific to the target technique of interest to a user.

5.5.4 User Profiles

Additionally or alternatively, the computer system can implement methods and techniques described above: to access a combination of subsets of historical data (e.g., associated with a target threat actor; associated with a target industry; associated with a target technique), such as in response to selection of the combination of subsets of historical data by a user at a user interface; and to generate a fourth transition probability matrix based on the combination of subsets of historical data.

Additionally, the computer system can implement methods and techniques described above: to access a subset of historical assessment results corresponding to a particular network(s) (e.g., target network(s), network(s) affiliated with a particular industry, network(s) targeted by a particular threat actor), such as in response to selection of the combination of subsets of historical data by a user at a user interface; and to define a fourth set of emission probability vectors based on the of historical assessment results.

The computer system can implement methods and techniques described above: to generate a fourth model correlating the target sequence of observations with the hidden state sequence of techniques based on the fourth transition probability matrix, the fourth set of emission probability vectors, and an initial technique vector; to associate the fourth model with a fourth profile (e.g., corresponding to the user and/or target network); and store the fourth model and/or the fourth profile in a data repository.

Accordingly, the computer system can thereby generate a custom model to probabilistically calculate a sequence of techniques specific to: a particular industry in which the user or target network aligns; a threat actor against which the user is defending; and/or a technique in which the user is interested in researching.

7. Probabilistic Attack Sequence

Block S122 of the method S100 recites calculating a sequence of techniques in the set of techniques based on the model, the sequence of techniques exhibiting greatest probability to yield, for each technique in the sequence of techniques: absence of detection of the technique; and absence of prevention of the technique.

Generally, in Block S122, the computer system can calculate (or generate) a sequence of techniques based on the model and an observed sequence of observations (or vectors) (e.g., detection of a technique or absence of detection of the technique, prevention of a technique or absence of prevention of the technique). More specifically, based on a target sequence of observations and the model correlating the target sequence of observations with a hidden state sequence of techniques, the computer system can probabilistically calculate a sequence of techniques—corresponding to the hidden state sequence of techniques—exhibiting greatest probability to yield, for each technique in the sequence of techniques: absence of detection of the technique; and absence of prevention of the technique.

In one implementation, in Block S120, the computer system can define a first sequence of observations, each observation in the set of observations representing: absence of detection of a technique in the set of techniques; and absence of prevention of the technique.

In another implementation, in Block S122, the computer system can calculate the sequence of techniques based on the model and the first sequence of observations, the sequence of techniques exhibiting greatest probability to yield, for each technique in the sequence of techniques: absence of detection of the technique; and absence of prevention of the technique.

The computer system can calculate the sequence of techniques exhibiting a sequence length T (e.g., 5, 6, 7). For example, the computer system can: receive selection of a sequence length T (e.g., at a user interface); and calculate the sequence of techniques exhibiting the sequence length T.

In one example, the computer system defines a first sequence of observations, each observation in the set of observations representing: absence of detection of a technique in the set of techniques; and absence of prevention of the technique. In response to receiving a sequence length of five, the computer system calculates a first sequence of techniques—based on the first sequence of observations and the model—exhibiting the sequence length of five and exhibiting greatest probability to yield, for each technique in the sequence of techniques: absence of detection of the technique; and absence of prevention of the technique. In this example, the computer system calculates the first sequence of techniques including: a technique for phishing as an initial technique (e.g., in a first position) in the sequence; a technique for remote services as a second technique (e.g., in a second position) in the sequence; a technique for system location discovery as a third technique (e.g., in a third position) in the sequence; the technique for remote services as a fourth technique (e.g., in a fourth position) in the sequence; and a technique for data encryption for impact as a fifth technique (e.g., in a fifth position) in the sequence.

7.1 Probabilistic Attack Sequence Based on Profile

In another implementation, the computer system can calculate the sequence of techniques based on a model corresponding to a selected profile.

In one example, the computer system: receives selection—at a user interface—of a first profile corresponding to a first threat actor; accesses a first model associated with the first profile; and, based on the first model, calculates a first sequence of techniques exhibiting greatest probability to yield, for each technique in the first sequence of techniques: absence of detection of the technique; and absence of prevention of the technique.

Accordingly, the computer system can calculate a sequence of techniques most likely to be implemented by the first threat actor and exhibiting greatest probability to yield absence of detections and preventions of techniques in the sequence of techniques. Therefore, the computer system can enable a user to investigate vulnerability of a target network to the first threat actor based on this sequence of techniques.

In another example, the computer system: detects affiliation of a target network with aerospace industry based on network configuration data, network traffic data, etc.; accesses a second profile corresponding to with aerospace industry; accesses a second model associated with the second profile; and, based on the second model, calculates a second sequence of techniques exhibiting greatest probability to yield, for each technique in the second sequence of techniques: absence of detection of the technique; and absence of prevention of the technique.

8. Attack Graph Generation

Block S124 of the method S100 recites generating an attack graph including a set of nodes linked according to the sequence of techniques, each node in the set of nodes: corresponding to a technique in the sequence of techniques; and storing a behavior executable by a target asset on a target network to emulate the technique.

Generally, in Block S124, the computer system can generate an attack graph based on a sequence of techniques exhibiting greatest probability to yield, for each technique in the sequence of techniques: absence of detection of the technique; and absence of prevention of the technique.

In one implementation, in Block S124, the computer system can generate an attack graph including a set of nodes linked according to the sequence of techniques, each node in the set of nodes: corresponding to a technique in the sequence of techniques; and storing a behavior executable by a target asset on a target network to emulate the technique.

In one example, for a first technique in the sequence of techniques, the computer system can implement similar methods and techniques described in U.S. patent application Ser. No. 17/832,106: to derive a start condition at a machine prior to start of the first technique (e.g., based on an attack record); to derive an end condition at the machine following completion of the first technique (e.g., based on the attack record); to define a first nominal behavior executable by a target asset on a target network to emulate the first technique; to define a set of alternative (or "analogous") behaviors analogous to the nominal behavior and executable by the target asset to emulate a transition from the start condition to the end condition at the target asset; to define a target hierarchy for the nominal behavior and the set of alternative behaviors; and store the nominal behavior and the set of alternative behaviors according to the target hierarchy in a first node in the attack graph.

In this example, the computer system repeats this process for each technique in the sequence of techniques. The computer system then: links the set of nodes in the attack graph according to the sequence of techniques; and publishes the attack graph for scheduling instances on a population of target assets on the target network.

9. Attack Graph Emulation

Block S126 of the method S100 recites scheduling the target asset on the target network to selectively execute behaviors stored in the set of nodes in the attack graph during a third time period succeeding the second time period.

In one implementation, in Block S126, the computer system can schedule execution of an attack graph at a target asset in a target network. More specifically, the computer system can schedule the target asset on the target network to selectively execute behaviors stored in the set of nodes in the attack graph.

The target asset can then execute the attack graph according to the schedule (e.g., a start time, an attack graph period) set by the computer system (e.g., by the coordination service).

In particular, the target asset can execute methods and techniques described in U.S. patent application Ser. No. 17/832,106: to select a first node in the attack graph; to execute a first script defining a first behavior in the first node; to move to the second node in the attack graph if the first script successfully completes; to execute a second script defining a second behavior in the first node if the first behavior fails to complete; to move to the second node if the second behavior successfully completes; and to repeat this process until the target asset either completes a behavior in the first node or attempts all behaviors in the first node. The target asset then repeats this process for each subsequent node of the attack graph or until the target asset fails to complete any single behavior in one node of the attack graph.

10. Vulnerability

Blocks of the method S100 recite: accessing a set of alerts generated by a set of security tools, deployed on the target network, during the third time period in Block S130; and characterizing a vulnerability of the target network based on presence of alerts, in the set of alerts, indicating detection and prevention of behaviors, stored in nodes in the attack graph, executed by the target asset during the third time period in Block S134.

Blocks of the method S100 recite: generating a vulnerability report specifying the vulnerability score in Block S136; and serving the vulnerability report at an administrator device on the target network in Block S138.

Generally, in Blocks S130 and S134, the computer system can: aggregate alerts generated by security tools deployed on the computer network while the target asset executed the attack graph; identify a subset of alerts corresponding with behaviors in the attack graph executed by the target asset;

characterize vulnerability of the target network based on types and presence of detection and prevention alerts in this subset of alerts.

In one implementation, the computer system: accesses prevention alerts published by the set of security tools and indicating prevention of behaviors occurring on the target network by the set of security tools during the scheduled period of the attack graph executed by the target asset in Block S130; scans the set of alerts for prevention alert corresponding to a behavior—stored in a node in the set of nodes in the attack graph—attempted by the target asset during this scheduled period; and characterizes the target network as vulnerable to an attack (e.g., an attack most likely to be implemented by a particular threat actor, an attack most likely to be implemented in a particular industry) in response to absence of the particular prevention alert in the set of prevention alerts in Block S134. More specifically, if the set of prevention alerts omits prevention alert that resulted in termination of a node of the attack graph and thus failed completion of the attack graph by the target asset, the computer system can identify the target asset—and the target network more generally—as vulnerable to the attack. Similarly, the computer system can characterize the target network as vulnerable to the attack in response to completion of a behavior in a last node of the attack graph by the target asset in Block S134.

In another implementation, the computer system can: access detection alerts published by the set of security tools and indicating detection of behaviors, occurring on the target network, by the set of security tools; and similarly access prevention alerts published by the set of security tools and indicating prevention of behaviors, occurring on the target network, by the set of security tools in Block S130. The computer system can then: correlate a subset of alerts, in this set of alerts, with behaviors executed by the target asset according to the attack graph in Block S132; and calculate a vulnerability (e.g., a vulnerability score) of the target network to the attack inversely proportional to a quantity of alerts in the subset of alerts and presence of prevention alert in the subset of alerts in Block S134. More specifically, a generation of a greater frequency of detection and prevention alerts by the security tools responsive to behaviors attempted by the target asset according to the attack graph may indicate greater hardness of the target asset and the target network against the attack and analogs. Therefore, the computer system can calculate a lesser vulnerability (e.g., a lower vulnerability score) of the target network to the attack in response to a high ratio of detection and prevention alerts generated by the security tools per behavior in the attack graph attempted by the target asset.

The computer system can then return the vulnerability (e.g., a vulnerability score) of the target network to security personnel, such as via a vulnerability report.

For example, the computer system can: generate a vulnerability report specifying the vulnerability score in Block S136; and serve the vulnerability report at an administrator device on the target network in Block S138.

The computer system can also: aggregate identifiers and/or descriptors of behaviors successfully completed by the target asset, behaviors completed by the attack graph and detected but not prevented by the security tools, and behaviors attempted by the target asset but prevented by the security tools; and populate the vulnerability report with these data.

Security personnel may then selectively reconfigure these security tools to achieve different combinations of prevention and detection of these behaviors and thus reduce vulnerability of the target network to the known attack and analogs.

11. Attack Graph Report

Block S140 of the method S100 recites generating an attack graph report specifying the sequence of techniques and, for each technique in the sequence of techniques: an identifier of the technique; a description of the technique; and a set of mitigations representing a set of actions to prevent the technique from successfully executing on the target asset.

Block S142 of the method S100 recites serving the attack graph report at a user interface.

Generally, in Block S140, the computer system can generate an attack graph report specifying: the sequence of techniques; descriptions of techniques in the sequence of techniques; and mitigations for updating security controls behaviors responsive to individual techniques in the sequence of techniques.

In one implementation, in Block S140, the computer system can generate an attack graph report specifying the sequence of techniques of the attack graph. More specifically, the computer system can generate the attack graph report specifying the sequence of techniques of the attack graph and, for each technique in the sequence of techniques of the attack graph: an identifier of the technique; a name of the technique; a description of the technique; a set of mitigations representing a set of actions to prevent the technique from successfully executing on the target asset; probabilities of detection and/or prevention of the technique; and/or a probability of the sequence of techniques including the technique at a respective position in the sequence of techniques.

Additionally, the computer system can generate the attack graph report further specifying, for each mitigation in the set of mitigations: an identifier of the mitigation; a name of the mitigation; and/or a description for the mitigation.

Furthermore, the system can generate the attack graph report further specifying: the vulnerability report; a probability of the attack graph corresponding to absence of detection of the techniques and absence of prevention of the techniques; the transition probability matrix; the set of emission probability vectors; the initial technique vector; and/or other information.

In another implementation, in Block S142, the computer system can serve the attack graph report at a user interface of a device. In one example, the computer system serves the attack graph report on a display of the computer system. In another example, the computer system: serves the attack graph report to computing devices (e.g., mobile devices, desktop computers, or laptop computers networked with the computer system) with appropriate credentials for viewing the attack graph report.

In one implementation, the computer system can generate and serve the attack graph report prior to (and/or omitting) execution of the attack graph at a target asset.

In one variation, the computer system can generate and serve the attack graph report in response to executing the attack graph at a target asset. In this variation, the computer system can generate the attack graph report specifying, for each technique in the sequence of techniques of the attack graph: detection (or absence of detection) of the technique (or behavior corresponding to the technique) responsive to execution of the attack graph at the target asset; and/or prevention (or absence of prevention) of the technique responsive to execution of the attack graph at the target asset.

Additionally or alternatively, the computer system can: calculate a second sequence of techniques exhibiting greatest probability of utilization by a particular threat actor and/or in a particular industry; and generate the attack graph report specifying the second sequence of techniques. Additionally, the computer system can generate the attack graph report further specifying, for each technique in the second sequence of techniques: a probability of detecting the technique; and a probability of preventing the technique.

12. Model Update & Training

Generally, the computer system can update the model in response to: executions (or emulations) of attack graphs by target assets on target networks; receiving additional historical information (e.g., threat reports, logs, attack records) representing sequences of techniques implemented in previous attacks; receiving threat intelligence representing update utilization of techniques by a particular threat actor and/or within a particular industry; and/or other information.

12.1 Model Update & Training: Attack Graph Emulation

Blocks of the method S100 recite: defining a second set of emission probability vectors based on the set of emission probability vectors and presence of alerts, in the set of alerts, indicating detection and prevention of behaviors, corresponding to techniques in the sequence of techniques, executed by the target asset during the third time period in Block S108; and updating the model based on the transition probability matrix, the second set of emission probability vectors, and the initial technique vector in Block S122.

In one implementation, the computer system can: access a set of alerts generated by a set of security tools, deployed on the target network, responsive to responsive to execution (or emulation) of an attack graph on a target asset on the target network as a first set of historical assessment results; define a second set of emission probability vectors based on the first set of historical assessment results, as described above; and update the model based on the transition probability matrix, the second set of emission probability vectors, and the initial technique vector.

More specifically, the computer system can define the second set of emission probability vectors based on presence of alerts indicating detection and prevention (or absence of alerts indicating absence of presence or detection) of behaviors—corresponding to techniques in the sequence of techniques—executed (emulated) by the target asset and a set of emission probability vectors (e.g., a first set of emission probability vectors based on which the model was generated).

In another implementation, in response to the updating the model, the computer system can associate the model with a profile (e.g., a profile associated with the target network) and/or store the model in a data repository.

Accordingly, the computer system can update the emission probability vectors and the model based on actual security controls behavior during emulation of the attack graph on the target network. Therefore, the computer system can improve accuracy of when calculating a sequence of techniques exhibiting greatest probability to yield, for each technique in the sequence of techniques: absence of detection of the technique; and absence of prevention of the technique.

12.1.1 Technique Failure

In one implementation, as shown in FIG. 2B, based on the set of alerts generated by the set of security tools, deployed on the target network, responsive to responsive to execution (or emulation) of an attack graph on a target asset on the target network, the computer system can: identify a subset of techniques, in a sequence of techniques in the attack graph, exhibiting absence of detection and absence of prevention by the target asset.

More specifically, in Block S104, in response to absence of a first alert, in the set of alerts, indicating detection and prevention of a first behavior executed by the target asset corresponding to a second technique in the sequence of techniques, the computer system can generate a second transition probability matrix defining a second set of transition probabilities including a second transition probability representing a second probability of transitioning from a first technique to the second technique, the second transition probability exceeding a first transition probability—representing a first probability of transitioning from the first technique to the second technique—defined in a first (or "prior") transition probability matrix.

The computer system can generate a second model correlating the target sequence of observations with the hidden state sequence of techniques based on the second transition probability matrix, the set of emission probability vectors, and the initial technique vector in Block S122.

Accordingly, by generating the second transition probability matrix defining the second transition probability exceeding the first transition probability, the computer system can thereby increase a likelihood that the second model calculates a sequence of techniques including the second technique. Therefore, the computer system can: predict additional sequences of techniques including the second technique and likely to be implemented in analogous attacks of interest to a user; and more rapidly generate additional attack graphs based on these sequences of techniques to further investigate and expose vulnerability of the target asset and/or target network to the second technique.

In another implementation, the computer system can: calculate a second sequence of techniques in the set of techniques based on the second model, the second sequence of techniques including the second technique and exhibiting greatest probability to yield—for each technique in the second sequence of techniques—absence of detection of the technique and absence of prevention of the technique in Block S122; generating a second attack graph including a second set of nodes linked according to the second sequence of techniques in Block S124; and automatically scheduling a target asset to selective execute behaviors stored in the second set of nodes in the second attack graph in Block S126.

Additionally or alternatively, the computer system can calculate a set of sequences of techniques based on the second model, the set of sequences of techniques including the second sequence of techniques, each sequence of techniques in the set of sequences of techniques including the second technique in Block S122. The computer system can generate a set of attack graphs including nodes linked according to the set of sequences of techniques and storing behaviors executable by the target asset on the target network to emulate techniques in the set of sequences of techniques in Block S124; and automatically schedule the target asset on the target network to selectively execute behaviors stored in nodes in each attack graph in the set of attack graphs in Block S126.

12.2 Model Update & Training: Expectation-Maximization

Generally, the computer system can train the model based on Expectation-Maximization algorithm to maximize a likelihood of the model corresponding to an observed sequence of observations (e.g., vectors).

In one implementation, the computer system can recalculate the transition probability matrix and the set of emission probability vectors based on an Expectation-Maximization algorithm corresponding to, for each technique in the sequence: absence of detection of the technique; and absence of prevention of the technique. In particular, the computer system can iteratively recalculate the transition probability matrix and the set of emission probability vectors based on the Expectation-Maximization algorithm.

However, the computer system can implement any other method or technique to recalculate the transition probability matrix and the set of emission probability vectors based on an Expectation-Maximization algorithm.

In one implementation, in response to recalculating the transition probability matrix and the set of emission probability vectors, the computer system can generate an updated model (or "trained model") based on: the transition probability matrix; the set of emission probability vectors; and the initial technique vector. The computer system can: associate the trained model with a profile; and/or store the trained model in a data repository.

In another implementation, the computer system can repeat this process to iteratively train a set of models, each model associated with a different profile.

12.3 Model Update & Training: Threat Intelligence

Blocks of the method S100 recite: accessing threat intelligence specifying a second utilization of the first technique in attacks by the first threat actor during a fifth time period succeeding the fourth time period, the second utilization exceeding the first utilization in Block S150; based on the threat intelligence, generating a second probability container defining a second set of transition probabilities including a second transition probability representing a second probability of transitioning from the first technique to the second technique in Block S104, the second transition probability exceeding the first transition probability; generating a second model correlating the target sequence of observations with the hidden state sequence of techniques based on the second transition probability container, the set of emission probability containers, and the initial technique container in Block S112; and associating the second model with the first profile corresponding to the first threat actor in Block S114.

Generally, in Block S150, the computer system can receive threat intelligence specifying a change in utilization (e.g., increase in utilization, decrease in utilization) of a technique (or a subset of techniques) in attacks by a particular threat actor and/or within a particular industry during a time period.

In one implementation, during a first time period, the computer system can: access a first subset of historical data representing a first utilization of a first technique in attacks by a first threat actor during a second time period preceding the first time period; generate a first transition probability matrix based on the first subset of historical data; and generate a first model based on the first transition probability matrix, a set of emission probability vectors, and an initial technique vector.

In this implementation, during a third time period succeeding the first time period, the computer system can: access threat intelligence specifying a second utilization (e.g., exceeding the first utilization, falling below the first utilization) of the first technique in attacks by the first threat actor during a fourth time period succeeding the second time period in Block S150; generate a second transition probability matrix based on the threat intelligence; and generate a second model based on the second transition probability matrix, the set of emission probability vectors, and the initial technique vector. The computer system can associate the second model with a profile associated with the first threat actor.

In another implementation, in response to accessing (or receiving) the threat intelligence and generating the second model, the computer system can implement methods and techniques described above to automatically: calculate a second sequence of techniques based on the second model; generate a second attack graph including a second set of nodes linked according to the second sequence of techniques; and schedule a target asset on the target network to selectively execute behaviors stored in second set of nodes in the second attack graph.

Accordingly, the computer system can: dynamically update the model based on new intelligence representing current practices and/or exploits implemented by the first threat actor; generate a new attack graph based on model; and automatically scheduling the new attack graph for execution (or emulation) by a target asset on the target network. Therefore, the computer system can expose vulnerabilities on the target network to the current practices and/or exploits implemented by the first threat actor and reduce a duration of time for closing gaps in security controls of the target network.

13. Network Configuration Change

Generally, the computer system can: detect a change (e.g., mitigations, reconfiguration of security tools, software patch installation, firewall installation) in configuration of a target asset and/or a target network; and schedule execution of an attack graph on the target asset in response to detecting the change.

In one implementation, the computer system can: access second configuration data representing a second configuration of the target network during a second time period in Blocks S152 and/or S154; and, in response to a difference between the second configuration and a first configuration representing the target network during a first time period preceding the second time period, automatically schedule the target asset on the target network to selectively execute behaviors stored in a set of nodes in an attack graph in Block S126.

Accordingly, the computer system can automatically: detect configuration changes to mitigate vulnerabilities in the target network; and iteratively schedule attack graphs to test these configuration changes, thereby enabling security personnel to validate the configuration changes and the overall security posture of the target network.

14. Multiple Attack Graphs Based on Selected Technique

Generally, as described above, the computer system can: receive user selection (e.g., at a user interface) of a second technique in set of techniques; and generate a second transition probability matrix defining a second set of transition probabilities including a second transition probability representing a second probability of transitioning from a first technique to the second technique, the second transition probability exceeding a first transition probability—representing a first probability of transitioning from the first technique to the second technique—defined in a first (or "prior") transition probability matrix. The computer system can generate a second model correlating the target sequence of observations with the hidden state sequence of techniques based on the second transition probability matrix, the set of emission probability vectors, and the initial technique vector.

Additionally, the computer system can calculate a second sequence of techniques in the set of techniques based on the second model, the second sequence of techniques including the second technique and exhibiting greatest probability to yield, for each technique in the second sequence of techniques: absence of detection of the technique; and absence of prevention of the technique.

In one implementation, in Block S122, the computer system can calculate a set of sequences of techniques based on the second model, the set of sequences of techniques including the second sequence of techniques, each sequence of techniques in the set of sequences of techniques including the second technique. The computer system can generate a set of attack graphs including nodes linked according to the set of sequences of techniques and storing behaviors executable by the target asset on the target network to emulate techniques in the set of sequences of techniques in Block S124; and automatically schedule the target asset on the target network to selectively execute behaviors stored in nodes in each attack graph in the set of attack graphs in Block S126.

Accordingly, the computer system can: calculate multiple different sequences of techniques including the second technique selected by a user at a user interface; generate a set of attack graphs including these sequences of techniques including the second technique; and emulate the set of attack graphs at a target asset(s) on the target network. Therefore, the computer system can enable a user to investigate vulnerability of the target network to other techniques associated with the second technique and permutations of techniques including the second technique likely to be implemented by a particular threat actor and/or implemented in a particular industry.

15. Technique Exploration & Custom Attack Graphs

Blocks of the method S100 recite: accessing the first model in response to receiving selection of the first profile in Block S118; calculating a first sequence of techniques in the set of techniques based on the model in Block S122; and rendering an interface specifying the first sequence of techniques in Blocks S140 and S142.

In one implementation, during a first time period, the computer system can execute methods and techniques described above to: generate a transition probability matrix defining a set of transition probabilities based on the set of historical data (e.g., associated with a first threat actor, associated with a first industry), the set of transition probabilities including a first transition probability representing a first probability of transitioning from a first technique to a second technique; define a set of emission probability vectors corresponding to the set of techniques; defining an initial technique vector representing an initial probability distribution of techniques in the set of techniques; generate a first model correlating a target sequence of observations with a hidden state sequence of techniques based on the transition probability matrix, the set of emission probability vectors, and the initial technique vector; and associate the first model with a first profile (e.g., corresponding to the first threat actor, corresponding to the first industry).

Figure 3:
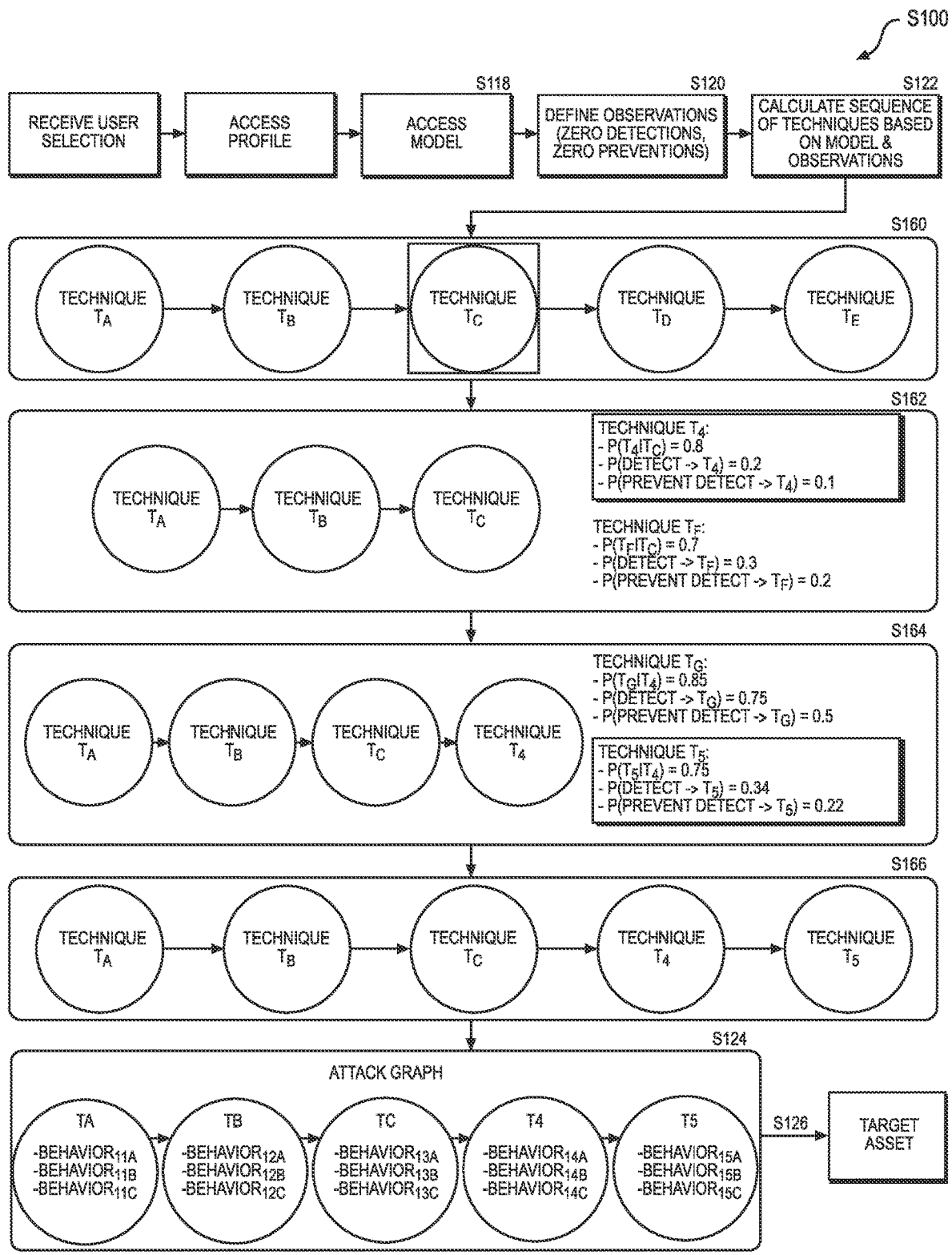
FIG. 3 is a flowchart representation of one variation of the method.

In this implementation, as shown in FIG. 3, during a second time period succeeding the first time period, the computer system can execute methods and techniques described above to receive selection of a first profile; access a first model associated with the first profile; and calculating a first sequence of techniques in the set of techniques based on the first model.

In one example, the computer system calculates the first sequence of techniques exhibiting greatest probability to yield, for each technique in the sequence of techniques: absence of detection of the technique; and absence of prevention of the technique.

In another example, the computer system calculates the first sequence of techniques exhibiting greatest probability of utilization by the first threat actor and/or in the first industry.

In Blocks S140, S142 and S160, the computer system can render an interface specifying the first sequence of techniques. For example, the computer system can: generate an attack graph report specifying the first sequence of technique and, for each technique in the first sequence of techniques, a probability of detecting the technique and a probability of preventing the technique; and serve the attack graph report at a user interface.

In another implementation, in Block S162, in response to receiving selection (e.g., at the interface) of a third technique in the sequence of techniques, the computer system can update the interface based on the first model. More specifically the computer system can update the interface specifying: the sequence of techniques including the third technique; a probability of transitioning from the third technique to a fourth technique in the set of techniques; a probability of detecting the fourth technique; and/or a probability of preventing the fourth technique. The computer system can repeat this process to update the interface specifying, for each technique in the set of techniques: a probability of transitioning from the third technique to the technique; a probability of detecting the technique; and/or a probability of preventing the technique. The computer system can sort the set of techniques in the interface according to probability of transitioning from the third technique to a technique in the set of techniques (e.g., greatest probability to least probability).

Accordingly, by updating the interface specifying—for a selected technique in the sequence of techniques—probabilities of transitioning from the selected to other techniques, the computer system can thereby enable a user to explore potential vulnerabilities (or absence of vulnerabilities) of a target network to particular techniques based on these probabilities.

In another implementation, in response to receiving selection of the fourth technique, the computer system can repeat this process to update the interface based on the first model. For example, in response to receiving selection of the fourth technique, in Block S164, the computer system can update the interface the interface specifying: a second sequence of techniques based on the first sequence of techniques and including the third technique and the fourth technique; a probability of transitioning from the fourth technique to the fifth technique; a probability of detecting the fifth technique; and a probability of preventing the fifth technique. Additionally, the computer system can update the interface specifying, for each technique in the set of techniques: a probability of transitioning from the fourth technique to the technique; a probability of detecting the technique; and/or a probability of preventing the technique.

In another implementation, the computer system can receive selection of the fifth technique as a final technique. In response to receiving selection of the fifth technique, the computer system can update the interface specifying a third sequence of techniques including the third technique, the fourth technique, and the fifth technique in Block S166. The computer system can then execute methods and techniques described above: to generate an attack graph including a set of nodes linked according to the third sequence of techniques in Block S124, each node in the set of nodes corresponding to a technique in the third sequence of techniques and storing a behavior executable by a target asset on a target network to emulate the technique; and to scheduling the target asset on the target network to selectively execute behaviors stored in the set of nodes in the attack graph in Block S126.

Accordingly, the computer system can: render an interface that presents transition probabilities between techniques and that enables a user to generate a custom attack sequence based on stepwise selection of techniques through the interface; and generate an attack graph based on the custom attack sequence; and schedule the attack graph for execution (or emulation) on a target asset on the target network. Therefore, the computer system can enable rapid generation and deployment of custom attack graphs specific to: a particular industry in which the user aligns; a particular threat actor against which the user is defending; and/or a particular technique in which the user is interested in investigating.

16. Conclusion

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method comprising:
during a first time period:
accessing a set of historical data representing permutations of techniques, in a set of techniques, implemented in attacks on a second computer network occurring prior to the first time period;
generating a transition probability container defining a set of transition probabilities based on the set of historical data, the set of transition probabilities comprising a first transition probability representing a first probability of transitioning from a first technique, in the set of techniques, to a second technique in the set of techniques;
defining a set of emission probability containers corresponding to the set of techniques, the set of emission probability containers comprising a first emission probability container representing:
a second probability of detecting the second technique; and
a third probability of preventing the second technique;
defining an initial technique container representing an initial probability distribution of techniques in the set of techniques; and
generating a model correlating a target sequence of observations with a hidden state sequence of techniques based on the transition probability container, the set of emission probability containers, and the initial technique container; and
during a second time period succeeding the first time period:
calculating a sequence of techniques in the set of techniques based on the model, the sequence of techniques exhibiting greatest probability to yield, for each technique in the sequence of techniques:
absence of detection of the technique; and
absence of prevention of the technique;
generating an attack graph comprising a set of nodes linked according to the sequence of techniques, each node in the set of nodes:
corresponding to a technique in the sequence of techniques; and
storing a behavior executable by a target asset on a target network to emulate the technique; and
scheduling the target asset on the target network to selectively execute behaviors stored in the set of nodes in the attack graph during a third time period succeeding the second time period.

2. The method of claim 1, further comprising:
accessing a set of alerts generated by a set of security tools, deployed on the target network, during the third time period; and
characterizing a vulnerability of the target network based on presence of alerts, in the set of alerts, indicating detection and prevention of behaviors, stored in nodes in the attack graph, executed by the target asset during the third time period.

3. The method of claim 2, further comprising:
in response to absence of a first alert, in the set of alerts, indicating detection and prevention of a first behavior executed by the target asset during the third time period and corresponding to the second technique, generating a second transition probability container defining a second set of transition probabilities comprising a second transition probability representing a second probability of transitioning from the first technique to the second technique, the second transition probability exceeding the first transition probability;

generating a second model correlating the target sequence of observations with the hidden state sequence of techniques based on the second transition probability container, the set of emission probability containers, and the initial technique container;

calculating a second sequence of techniques in the set of techniques based on the second model, the second sequence of techniques comprising the second technique and exhibiting greatest probability to yield, for each technique in the second sequence of techniques:
absence of detection of the technique; and
absence of prevention of the technique;

generating a second attack graph comprising a second set of nodes linked according to the second sequence of techniques, each node in the set of nodes:
corresponding to a technique in the second sequence of techniques; and
storing a behavior executable by a second target asset on the target network to emulate the technique; and automatically scheduling the second target asset to selective execute behaviors stored in the second set of nodes in the second attack graph.

4. The method of claim 2, further comprising:
defining a second set of emission probability containers based on:
the set of emission probability containers; and
presence of alerts, in the set of alerts, indicating detection and prevention of behaviors, corresponding to techniques in the sequence of techniques, executed by the target asset during the third time period; and
updating the model based on the transition probability container, the second set of emission probability containers, and the initial technique container.

5. The method of claim 2:
wherein characterizing the vulnerability of the target network comprises:
correlating a subset of alerts, in the set of alerts, with behaviors executed by the target asset according to the attack graph; and
calculating a vulnerability score of the target network inversely proportional to:
a quantity of alerts in the subset of alerts; and
presence of prevention alert in the subset of alerts; and
further comprising:
generating a vulnerability report specifying the vulnerability score; and
serving the vulnerability report at an administrator device on the target network.

6. The method of claim 1:
wherein accessing the set of historical data comprises accessing a first subset of historical data, in the set of historical data, representing permutations of techniques, in the set of techniques, implemented in attacks by a first threat actor in a set of threat actors;
wherein generating the transition probability container comprises generating a first transition probability container based on the first subset of historical data;
wherein generating the model comprises generating a first model correlating the target sequence of observations with the hidden state sequence of techniques based on the first transition probability container, the set of emission probability containers, and the initial technique container;

further comprising, during the first time period, associating the first model with a first profile corresponding to the first threat actor; and wherein calculating the sequence of techniques comprises calculating the sequence of techniques based on the first model in response to receiving selection of the first profile.

7. The method of claim 6:
wherein accessing the first subset of historical data comprises accessing the first subset of historical data representing a first utilization of the first technique in attacks by the first threat actor during a fourth time period preceding the first time period;
further comprising, during a fifth time period succeeding the second time period:
accessing threat intelligence specifying a second utilization of the first technique in attacks by the first threat actor during a fifth time period succeeding the fourth time period, the second utilization exceeding the first utilization;
based on the threat intelligence, generating a second probability container defining a second set of transition probabilities comprising a second transition probability representing a second probability of transitioning from the first technique to the second technique, the second transition probability exceeding the first transition probability;
generating a second model correlating the target sequence of observations with the hidden state sequence of techniques based on the second transition probability container, the set of emission probability containers, and the initial technique container; and
and associating the second model with the first profile corresponding to the first threat actor.

8. The method of claim 1:
further comprising, during the first time period, accessing first configuration data representing a first configuration of the target network comprising a set of target assets, each target asset in the set of target assets comprising an operating system characterized by a first operating system type;
wherein generating the transition probability container comprises generating the transition probability container defining the set of transition probabilities based on the set of historical data and the first configuration data, the set of transition probabilities comprising a second transition probability representing a fourth probability of transitioning from the first technique to a third technique, in the set of techniques, associated with a second operating system type, the second transition probability corresponding to zero.

9. The method of claim 8, further comprising, during a fourth time period succeeding the third time period:
accessing second configuration data representing a second configuration of the target network; and
in response to a difference between the second configuration and the first configuration, automatically scheduling the target asset on the target network to selectively execute behaviors stored in the set of nodes in the attack graph.

10. The method of claim 1, further comprising:
in response to receiving selection of the second technique at a user interface, generating a second probability container defining a second set of transition probabilities comprising a second transition probability representing a second probability of transitioning from the first technique to the second technique, the second transition probability exceeding the first transition probability;

generating a second model correlating the target sequence of observations with the hidden state sequence of techniques based on the second transition probability container, the set of emission probability containers, and the initial technique container;

calculating a second sequence of techniques in the set of techniques based on the second model, the second sequence of techniques comprising the second technique and exhibiting greatest probability to yield, for each technique in the second sequence of techniques:
absence of detection of the technique; and
absence of prevention of the technique.

11. The method of claim 10, further comprising:
calculating a set of sequences of techniques based on the second model, the set of sequences of techniques comprising the second sequence of techniques, each sequence of techniques in the set of sequences of techniques comprising the second technique;
generating a set of attack graphs comprising nodes linked according to the set of sequences of techniques and storing behaviors executable by the target asset on the target network to emulate techniques in the set of sequences of techniques; and
automatically scheduling the target asset on the target network to selectively execute behaviors stored in nodes in each attack graph in the set of attack graphs.

12. The method of claim 1:
wherein accessing the set of historical data comprises accessing a second subset of historical data, in the set of historical data, representing permutations of techniques, in the set of techniques, implemented in attacks affiliated with aerospace industry;
wherein generating the transition probability container comprises generating a second transition probability container based on the second subset of historical data;
wherein generating the model comprises generating a second model correlating the target sequence of observations with the hidden state sequence of techniques based on the second transition probability container, the set of emission probability containers, and the initial technique container;
further comprising, during the first time period, associating the second model with a second profile corresponding to aerospace industry; and
wherein calculating the sequence of techniques comprises calculating the sequence of techniques based on the second model in response to detecting the target network affiliated with aerospace industry.

13. The method of claim 1:
further comprising, defining a first sequence of observations, each observation in the set of observations representing:
absence of detection of a technique in the set of techniques; and
absence of prevention of the technique; and
wherein generating the model comprises generating a hidden Markov model correlating the target sequence of observations with the hidden state sequence of techniques based on the transition probability container, the set of emission probability containers, and the initial technique container; and wherein calculating the sequence of techniques comprises calculating the sequence of techniques based on the hidden Markov model and the first sequence of observations.

14. The method of claim 1, wherein defining the initial technique container comprises defining the initial technique container representing:
a fourth probability of one for a fourth technique in the set of techniques as an initial technique in the sequence of techniques, the fourth technique representing initial access; and
a fifth probability of zero for a fifth technique in the set of techniques as the initial technique, the fifth technique representing exfiltration.

15. The method of claim 1, further comprising:
generating an attack graph report specifying:
the sequence of techniques; and
for each technique in the sequence of techniques:
an identifier of the technique;
a description of the technique; and
a set of mitigations representing a set of actions to prevent the technique from successfully executing on the target asset; and
serving the attack graph report at a user interface.

16. A method comprising:
during a first time period:
accessing a set of historical data representing permutations of techniques, in a set of techniques, implemented in attacks on a second computer network by a first threat actor in a set of threat actors;
generating a transition probability container defining a set of transition probabilities based on the set of historical data, the set of transition probabilities comprising a first transition probability representing a first probability of transitioning from a first technique, in the set of techniques, to a second technique in the set of techniques;
defining a set of emission probability containers corresponding to the set of techniques, the set of emission probability containers comprising a first emission probability container representing:
a second probability of detecting the second technique; and
a third probability of preventing the second technique;
defining an initial technique container representing an initial probability distribution of techniques in the set of techniques;
generating a first model correlating a target sequence of observations with a hidden state sequence of techniques based on the transition probability container, the set of emission probability containers, and the initial technique container; and
associating the first model with a first profile corresponding to the first threat actor; and
during a second time period succeeding the first time period:
accessing the first model in response to receiving selection of the first profile;
calculating a first sequence of techniques in the set of techniques based on the model;
rendering an interface specifying the first sequence of techniques;
in response to receiving selection of a third technique in the sequence of techniques, updating the interface based on the first model, the interface specifying:

a fourth probability of transitioning from the third technique to a fourth technique in the set of techniques;
a fifth probability of detecting the fourth technique; and
a sixth probability of preventing the fourth technique.

17. The method of claim 16, further comprising:
in response to receiving selection of the fourth technique, updating the interface based on the first model, the interface specifying:
a second sequence of techniques:
based on the first sequence of techniques; and
comprising the third technique and the fourth technique;
a seventh probability of transitioning from the fourth technique to the fifth technique;
an eighth probability of detecting the fifth technique; and
a ninth probability of preventing the fifth technique.

18. The method of claim 17, further comprising:
in response to receiving selection of the fifth technique, updating the interface specifying a third sequence of techniques comprising the third technique, the fourth technique, and the fifth technique;
generating an attack graph comprising a set of nodes linked according to the third sequence of techniques, each node in the set of nodes:
corresponding to a technique in the third sequence of techniques; and
storing a behavior executable by a target asset on a target network to emulate the technique; and
scheduling the target asset on the target network to selectively execute behaviors stored in the set of nodes in the attack graph.

19. The method of claim 16:
wherein calculating the first sequence of techniques comprises calculating the first sequence of techniques exhibiting greatest probability of utilization by the first threat actor; and
wherein rendering the interface comprises rendering the interface specifying, for each technique in the first sequence of techniques:
a probability of detecting the technique; and
a probability of preventing the technique.

20. A method comprising:
accessing a set of historical data representing permutations of techniques, in a set of techniques, implemented in attacks on a second computer network;
generating a transition probability matrix defining a set of transition probabilities based on the set of historical data, each transition probability in the set of transition probabilities representing a probability of transitioning from a technique i, in the set of techniques, to a technique j in the set of techniques;
defining a set of emission probability vectors corresponding to the set of techniques, each emission probability vector in the set of emission probability vectors representing:
a probability of detecting the technique i in the set of techniques; and
a probability of preventing the technique i in the set of techniques;
defining an initial technique vector representing an initial probability distribution of techniques in the set of techniques;
generating a hidden Markov model correlating a target sequence of observations with a hidden state sequence of techniques based on the transition probability matrix, the set of emission probability vectors, and the initial technique vector;
calculating a sequence of techniques in the set of techniques based on the hidden Markov model, the sequence of techniques exhibiting greatest probability to yield, for each technique in the sequence of techniques:
absence of detection of the technique; and
absence of prevention of the technique;
generating an attack graph report specifying the sequence of techniques; and
serving the attack graph report at a user interface.

* * * * *